(12) United States Patent
Valient et al.

(10) Patent No.: US 10,896,525 B2
(45) Date of Patent: Jan. 19, 2021

(54) GRAPHICS SYSTEM AND METHOD FOR USE OF SPARSE TEXTURES

(71) Applicant: Apple Inc., Cupertino, CA (US)

(72) Inventors: Michal Valient, San Jose, CA (US); Michael Imbrogno, San Jose, CA (US); Karol E. Czaradzki, Cupertino, CA (US); Narayanan Swaminathan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/428,403

(22) Filed: May 31, 2019

(65) Prior Publication Data

US 2020/0380734 A1 Dec. 3, 2020

(51) Int. Cl.
*G06T 11/00* (2006.01)
*G06T 1/20* (2006.01)
*G06T 1/60* (2006.01)

(52) U.S. Cl.
CPC .............. *G06T 11/001* (2013.01); *G06T 1/20* (2013.01); *G06T 1/60* (2013.01); *G06T 2210/08* (2013.01); *G06T 2210/36* (2013.01)

(58) Field of Classification Search
CPC . G06T 11/001; G06T 1/20; G06T 1/60; G06T 2210/08; G06T 2210/36
See application file for complete search history.

(56) References Cited

U.S. PATENT DOCUMENTS

| 6,326,976 B1* | 12/2001 | Huettner | G06T 15/04 |
| | | | 345/581 |
| 2015/0178879 A1* | 6/2015 | Palmer | G06F 9/505 |
| | | | 345/506 |
| 2016/0078637 A1* | 3/2016 | Park | G06T 1/60 |
| | | | 345/587 |
| 2017/0358109 A1* | 12/2017 | Troiano | G06T 11/001 |
| 2018/0330468 A1* | 11/2018 | Mao | G06T 1/60 |
| 2019/0220383 A1* | 7/2019 | Brooking | G06F 9/4812 |

\* cited by examiner

*Primary Examiner* — William A Beutel
(74) *Attorney, Agent, or Firm* — Blank Rome LLP (57) ABSTRACT

This disclosure includes example embodiments of graphics processor memory management systems that support the use of graphical textures that are not fully bound or "backed" in memory throughout their entire lifespans. Such graphical textures are referred to herein as "sparse textures." According to some embodiments, sparse textures may be split into fixed-dimension pages in memory wherein, during execution, a user may indicate a desire to map certain pages to physical memory locations and populate such pages with the underlying data. In other embodiments, statistical information obtained from the graphics processor is used to aid in the determination of whether or not a given texture (or portion of a texture) needs physical memory backing. In yet other embodiments, the graphics processor may also enforce ordering guarantees, e.g., in instances when there are fewer pages in memory available than there is a need for backing of at a given moment in time.

20 Claims, 7 Drawing Sheets

GRAPHICS SYSTEM AND METHOD FOR USE OF SPARSE TEXTURES

TECHNICAL FIELD

This disclosure relates generally to the field of graphics processing. More particularly, but not by way of limitation, this disclosure relates to techniques implementable on a graphics processor, such as a graphics processing unit (GPU), to sparsely back textures and/or portions of textures (e.g., tiles) with physical memory in an intelligent and dynamic fashion, so as to conserve memory resources—while not unduly adversely affecting the graphical quality of a rendered scene.

BACKGROUND

In most graphical applications, access to the entirety of a given texture is not necessary for the entire duration of the rendering. For example, a camera view into a three-dimensional (3D) scene that is being rendered by a graphics processor may be controlled by a user to, e.g., zoom in, zoom out, move, change viewing direction, introduce objects nearer to the camera's viewpoint that occlude more distant portions of the 3D scene, etc. Such changes of the camera's view point may render certain portions of certain textures in the 3D scene to be not visible, or at least less prominent in the camera's view point, at certain moments in time. Thus, it follows that a satisfactory rendering of a given graphical scene may be produced without the need to load the entirety of each texture (e.g., including the highest resolution version of texture) represented in the scene into physical memory at all times.

SUMMARY

The following summary is included in order to provide a basic understanding of some aspects and features of the claimed subject matter. This summary is not an extensive overview and, as such, it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment, a method for managing graphics hardware resources is described. The example method comprises, on a graphics processor: allocating a pool of memory for a desired number of textures; loading a desired level of detail (LOD) version for each desired texture, e.g., from a mipmap; and then rendering a graphical scene using the loaded textures. Next, the graphics processor may begin to obtain statistical information over time for each texture (or portion of texture) that has been loaded. According to some embodiments, the statistical information may comprise usage information, e.g., a counter value reflecting the number of times a certain texture (or portion of a texture, such as a "tile" region of pixels within the texture) has been accessed. According to some embodiments, the statistical information may come directly from the graphics processor itself.

Next, for each loaded texture, the textures (or portions of textures, depending on the level of the granularity of the reported statistical information) may be sorted based, at least in part, on the obtained statistical information. Next, the graphics processor may determine to load backing data (i.e., "map" to locations in physical memory) for only those textures or portions of textures having statistical information that exceeds a threshold value, e.g., a threshold minimum number of accesses from memory over a given time interval. The textures or portions of textures that do not exceed the threshold value may be left unbacked or "unmapped" in physical memory—at least until the statistical information for such textures or portions of textures again exceed the threshold value, at which point they may again be mapped and backed by locations in physical memory.

According to some embodiments, one or more ordering rules may be applied to determine which textures (or portions of textures) are actually mapped in memory, e.g., in situations where there is not enough memory available to back all the desired textures or portions of textures at a given moment in time. Finally, the graphical rendering of the scene may be updated based on the newly-mapped (or unmapped) textures in physical memory.

In one embodiment, the above described methods, and variations thereof, may be implemented as a series of computer executable instructions. Such instructions may use any of one or more convenient programming languages. Such instructions may be collected into engines and/or programs and stored in any media that is readable and executable by a computer system, electronic device, or other programmable control device.

BRIEF DESCRIPTION OF THE DRAWINGS

While certain embodiments will be described in connection with the illustrative embodiments shown herein, this disclosure is not limited to those embodiments. On the contrary, all alternatives, modifications, and equivalents are included within the spirit and scope of this disclosure as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

With prior graphics rendering systems, various approaches have been taken to attempt to manage physical memory more efficiently during graphics rendering operations. For example, in some prior approaches, graphics rendering systems may have split single textures into multiple separate textures and then only loaded part of a texture at a time to attempt to limit the amount of information loaded into physical memory. In still other prior approaches, graphics rendering systems may have simply always loaded the highest level of detail (LOD) version of a given texture into memory (e.g., to avoid repetitive mappings and unmappings of different LOD versions of the texture over time). However, this would have the effect of sacrificing extra memory on parts of the texture that weren't really necessary to satisfactorily render the current 3D scene.

Graphics systems and methods are disclosed herein allowing for more "fine grained" control, e.g., via intelligent prioritization schemes, over what portions and/or what versions of textures are loaded (or not loaded) into physical memory at a given moment in time when rendering a graphical scene. Management of such memory control systems for graphics processors may be made further efficient via implementation directly in a graphics processor, i.e., rather than via regular intercommunication between a general processor (e.g., a CPU) and the graphics processor that is rendering the 3D scene.

This disclosure includes various example embodiments of graphics processor memory management systems and methods that support the use and creation of graphical textures that are not fully bound or "backed" in memory throughout their entire lifespans. Such graphical textures may be referred to herein as "sparse textures," "sparsely-backed textures," or "virtual textures." According to some embodiments, sparse textures may be split into fixed-dimension pages in memory wherein, during execution, a user may indicate a desire (e.g., via an Application Programming Interface, or API) to map certain pages to physical memory locations and populate such pages with the underlying texture data. In some embodiments, for increased efficiency, this memory management process may be contained entirely within the graphics processor, i.e., without intercommunication with a CPU. In still other embodiments, statistical information (e.g., in the form of hardware counters) may be obtained from the graphics processor to aid in the determination of whether or not a given texture (or portion of a texture) needs physical memory backing at a given moment in time. In yet other embodiments, the graphics processor may also enforce ordering guarantees, e.g., in instances when there are fewer pages in memory available than there is a need for backing of at a given moment in time.

As used herein, the term "kernel" in this disclosure refers to a computer program that is part of a core layer of an operating system (e.g., Mac OSX™) typically associated with relatively higher or the highest security level. The "kernel" is able to perform certain tasks, such as managing hardware interaction (e.g., the use of hardware drivers) and handling interrupts for the operating system. To prevent application programs or other processes within a user space from interfering with the "kernel," the code for the "kernel" is typically loaded into a separate and protected area of memory. Within this context, the term "kernel" may be interchangeable throughout this disclosure with the term "operating system kernel."

The disclosure also uses the term "compute kernel," which has a different meaning and should not be confused with the term "kernel" or "operating system kernel." In particular, the term "compute kernel" refers to a program for a graphics processor (e.g., GPU, DSP, or FPGA). In the context of graphics processing operations, programs for a graphics processor are classified as a "compute kernel" or a "shader." The term "compute kernel" refers to a program for a graphics processor that performs general compute operations (e.g., compute commands), and the term "shader" refers to a program for a graphics processor that performs graphics operations (e.g., render commands).

As used herein, the term "application program interface (API) call" in this disclosure refers to an operation an application is able to employ using a graphics application program interface (API). Examples of API calls include draw calls for graphics operations and dispatch calls for computing operations. Generally, a graphics driver translates API calls into commands a graphics processor is able to execute.

For the purposes of this disclosure, the term "processor" refers to a programmable hardware device that is able to process data from one or more data sources, such as memory. One type of "processor" is a general-purpose processor (e.g., a CPU or microcontroller) that is not customized to perform specific operations (e.g., processes, calculations, functions, or tasks), and instead is built to perform general compute operations. Other types of "processors" are specialized processor customized to perform specific operations (e.g., processes, calculations, functions, or tasks). Non-limiting examples of specialized processors include GPUs, floating-point processing units (FPUs), DSPs, FPGAs, application-specific integrated circuits (ASICs), and embedded processors (e.g., universal serial bus (USB) controllers).

As used herein, the term "graphics processor" refers to a specialized processor for performing graphics processing operations. Examples of "graphics processors" include, but are not limited to, a GPU, DSPs, FPGAs, and/or a CPU emulating a GPU. In one or more implementations, graphics processors are also able to perform non-specialized operations that a general-purpose processor is able to perform. Examples of general compute operations are compute commands associated with compute kernels.

As used herein, the term "tiles" refers to a portion of a larger graphical texture. Generally, tiles are sized to be substantially smaller than the size of the texture they are a part of, e.g., in order to reduce memory and bandwidth requirements for processing each tile. Tile sizes may be set prior to rendering a scene and may be fixed across all of the textures used to render a scene. Exemplary tile sizes may include 16×16 pixel and 32×32 pixel tiles, although arbitrarily sized tiles could be used. Generally, in rendering a tile, the entire tile is rendered in a single pass, and multiple tiles may be rendered in parallel.

Figure 1:
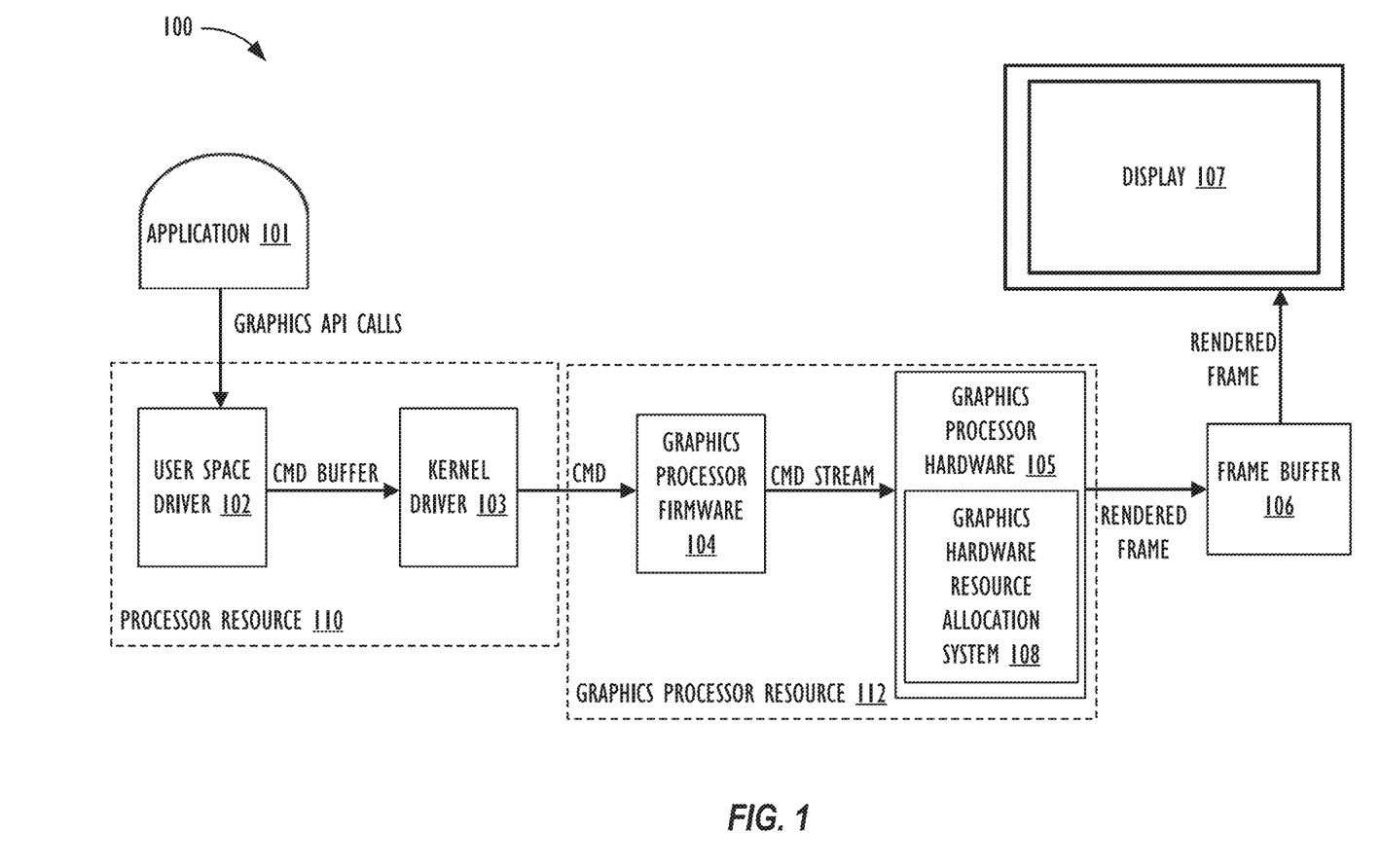
FIG. 1 is a diagram of a graphics processing path where embodiments of the present disclosure may operate.

FIG. 1 is a diagram of a graphics processing path 100 where embodiments of the present disclosure may operate. FIG. 1 illustrates an example in which the graphics processing path 100 utilizes a processor resource 110 and a graphics processor resource 112. The processor resource 110 includes one or more general-purpose processors (e.g., CPUs), where each processor has one or more cores. The processor resource 110 can also contain and/or communicate with memory, other microcontrollers, and/or any other graphics hardware resources a processor may utilize to process commands for graphics processor resource 112 to execute. The graphics processor resource 112 includes one or more graphics processors (e.g., GPUs), where each graphics processor has one or more execution cores and other computing logic for performing graphics and/or general compute operations. Stated another way, the graphics processor resource 112 may also encompass and/or communicate with memory (e.g., memory cache), and/or other graphics hardware resources to execute programs, such as shaders or compute kernels.

FIG. 1 illustrates that application 101 generates graphics API calls for the purpose of encoding commands for the graphics processor resource 112 to execute. To generate the graphics API calls, application 101 includes code written with a graphics API. The graphics API (e.g., Metal®) represents a published and/or standardized graphics library and framework that define functions and/or other operations that application 101 is able to have with a graphics processor. For example, the graphics API allows application 101 to be able to control the organization, processing, and submission of render and compute commands, as well as the management of associated data and resources for those commands.

In one or more implementations, application 101 is a graphics application that invokes the graphics API to convey a description of a graphics scene. Specifically, the user space driver 102 receives graphics API calls from application 101 and maps the graphics API calls to operations understood and executable by the graphics processor resource 112. For example, the user space driver 102 can translate the API calls into commands encoded within command buffers before being transferred to kernel driver 103. The translation operation may involve the user space driver 102 compiling shaders and/or compute kernels into commands executable by the graphics processor resource 112. The command buffers are then sent to the kernel driver 103 to prepare the commands for execution on the graphics processor resource 112. As an example, the kernel driver 103 may perform memory allocation and scheduling of the commands to be sent to the graphics processor resource 112. For the purpose of this disclosure and to facilitate ease of description and explanation, unless otherwise specified, the user space driver 102 and the kernel driver 103 are collectively referred to as a graphics driver.

FIG. 1 illustrates that the graphics processor firmware 104 obtains commands from processor resource 110. The graphics processor firmware 104 can perform a variety of operations to manage the graphics processor hardware 105 that includes powering on and off the graphics processor hardware 105 and/or scheduling the order of commands (and/or deciding which commands) the graphics processor hardware 105 receives for execution. With reference to FIG. 1 as an example, the graphics processor firmware 104 can be implemented by a graphics microcontroller that boots up firmware. Specifically, the graphics microcontroller could be embedded in the same package as a graphics processor within the graphic processor resource 112 and setup to pre-process commands for the graphics processor. In other implementations, the graphics microcontroller is physically separated from the graphics processor.

After scheduling the commands, in FIG. 1, the graphics processor firmware 104 sends command streams (e.g., multiple "kicks" of work) to the graphics processor hardware 105. As used herein, the term "kick" refers to a discrete unit of instructions that are submitted to a graphics processor. The graphics processor hardware 105 then executes the kicks within the command streams according to the order the graphics processor hardware 105 receives the kicks. The graphics processor hardware 105 includes graphics hardware resources that are able to execute a number of received kicks in parallel. The graphics processor hardware 105 then outputs rendered frames to frame buffer 106. In one implementation, the frame buffer 106 is a portion of memory, such as a memory buffer, that contains a bitmap that drives display 107. Display 107 subsequently accesses the frame buffer 106 and converts (e.g., using a display controller) the rendered frame (e.g., bitmap) to a video signal for display.

In one or more embodiments, the graphics processor hardware 105 may also include a graphics hardware resource allocation system 108 that allocates graphics hardware resources (not shown in FIG. 1) to execute kicks processor resource 110 submits to the graphics processor resource 112. The graphics hardware resource allocation system 108 receives the kicks and breaks the kicks down into work that the graphics hardware resources (e.g., vertex shaders, fragment shaders, united shader clusters, registers, or computational units) are able to execute. For example, the user kernel driver 103 splits commands committed for a graphics processor to execute into a finer granularity of instructions for the graphics processor to execute. The finer granularity of instructions represent kicks, where each kick can target a specialized type of "data master," or channel, of the graphics processor hardware (e.g., a pixel data master, fragment data master, or compute data master). For the purpose of this disclosure, the term "work" represents a finer unit of instructions than a kick. Stated another way, the graphics hardware resource allocation system 108 receives kicks and breaks the kicks down into a smaller granularity of instructions referenced as work.

Figure 2:
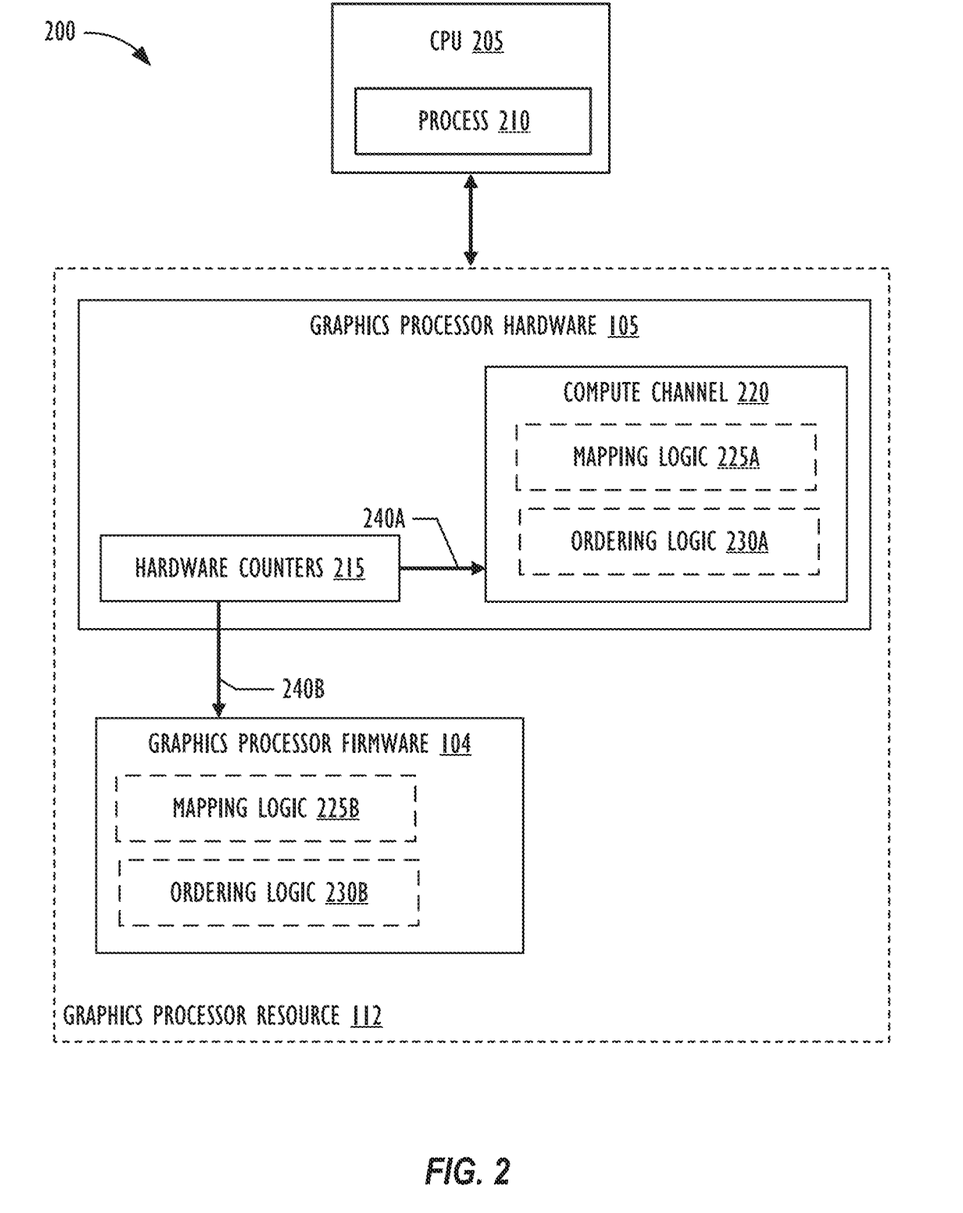
FIG. 2 is a block diagram of an embodiment of a graphics processor memory management system for graphics textures.

FIG. 2 is a block diagram of an embodiment of a graphics processor memory management system 200 for graphics textures. As shown in FIG. 2, the graphics processor memory management system 200 is part of the graphics processor resource 112 that communicates with a CPU 205 (on which one or more processes 210 requesting graphics rendering may be executing). As mentioned above, the graphics processor resource 112 includes one or more pieces of graphics processor hardware 105 (e.g., one or more GPUs), where each graphics processor has one or more execution cores and other computing logic for performing graphics and/or general compute operations. Graphics processor resource 112 may also comprise graphics processor firmware 104, which can perform a variety of operations to manage the graphics processor hardware 105.

In some embodiments described herein, graphics processor hardware 105 may also produce one or more hardware counters 215 for producing statistical information related to the operation of the graphics processor hardware. For example, hardware counters 215 may be used to track the number of times a given location in the on-chip memory has been accessed. In some embodiments, the location in memory tracked by a given counter may comprise an individual texture, or portion of a texture (e.g., an individual tile). Importantly, this statistical information is produced on (and may be communicated entirely within) the graphics processor hardware 105 itself, without sending or receiving information to or from the CPU 205.

According to some embodiments, a given graphics processor hardware may comprise multiple channels for distinct types of work that is to be performed on the graphics processor hardware. For example, in some instances, the graphics processor hardware may comprise a dedicated "compute" channel, illustrated as compute channel 220 in FIG. 2. Compute channel 220 may include various numbers of cores and/or caches and may be used to handle any number of general compute tasks (e.g., such as the mapping and unmapping of textures or portions of textures to regions in on-chip memory and/or the ordering between different thread groups) in a parallelized fashion on the graphic processor hardware.

Thus, in some such embodiments, the hardware counters 215 may expose their statistical information, e.g., via an interface 240A, directly to the compute channel 220. The compute channel 220 may further comprise a mapping logic module 225A, which may be configured to determine a priority order, based, at least in part, on the received statistical information from the hardware counters 215 for the mapping and unmapping of textures or portions of textures in the on-chip memory. For example, as mentioned above, in some embodiments, textures or portions of textures (e.g., tiles) that have been accessed the most frequently will receive a higher priority in terms of being allocated memory backing than tiles that have not recently been loaded, thereby providing finer granularity in control over which portions of which textures need to be resident in memory at any given moment in time.

The compute channel 220 may also further comprise an ordering logic module 230A, which may be configured to provide an ordering guarantee across the various textures or portions of textures that are requesting a memory backing. For example, according to some embodiments, the ordering logic module 230A may enforce a row-major ordering scheme, wherein consecutive elements in a row reside next to each other in memory. Generally speaking, not all GPUs will guarantee an ordering between different thread groups within a given compute dispatch. Thus, according to some embodiments, in order to guarantee a desired ordering, the graphics processor hardware may be configured to launch a single thread group, e.g., of up to a maximum number of possible threads allowed by the hardware, so that the threads may be coordinated amongst each other to guarantee the desired ordering. For example, in some embodiments, memory may be acquired in a specified order (e.g., as specified in an API), and then memory may be applied to the textures or portions of textures according to the specified order.

In one particular implementation of using a single thread group dispatch to handle ordering over an entire texture region, the following steps may be followed: 1) compute the total number of pages in memory needed to map the entire region (noting that the region could already have some pages mapped); 2) check if a sufficient number of pages are available in memory (e.g., in some implementations, the memory may take the form of a circular ring buffer/queue); 3) if a sufficient number of pages are available, update the circular ring buffer/queue of memory with the number of pages that is available; 4) if a sufficient number of pages are not available, record the number of pages actually available and update the ring buffer/queue of memory one time; and 5) each thread in the thread group checks to see if it has a valid page to map to and, if so, maps to it. In this way, the optimal allocation of all pages in a row-major order is guaranteed, while (ideally) using the GPU's compute channel 220 capabilities to parallelize the performance of the algorithm to the greatest extent possible.

In some embodiments, ordering logic 230 may perform ordering across mapping operations and/or ordering within a single mapping operation. In the case of ordering across mapping operations, a data master-level synchronization process may be employed to ensure the desired ordering. In the case of ordering within a single mapping operation, techniques such as those described above (e.g., the 'row-major ordering scheme') may be employed to ensure the desired ordering, enforcing guarantees of repeatability and determinism.

As illustrated in FIG. 2, the mapping logic 225 and ordering logic 230 may be implemented in various places within the graphics processor resource 112. As described above, the mapping logic 225A and ordering logic 230A may be implemented in the compute channel's hardware 220. However, in still other embodiments, the mapping logic 225B and ordering logic 230B may be implemented in the graphics processor firmware 104, e.g., via a different interface 240B. For example, if the graphics processor has a dedicated firmware processor or a programmable front end, the mapping and ordering logic could be implemented in such firmware. In still other embodiments, the mapping and ordering logic could be implemented in fixed function hardware on the graphics processor, if so desired.

Figure 3:
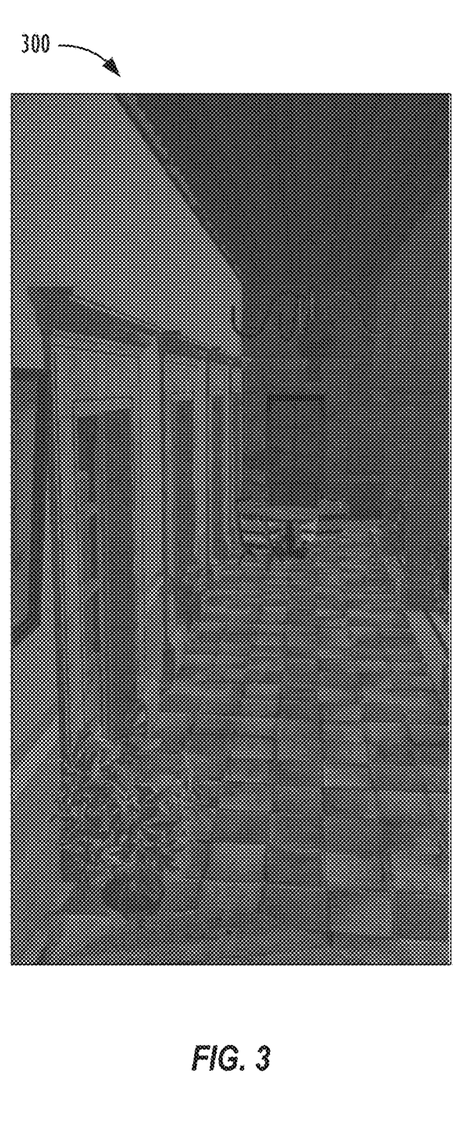
FIG. 3 is an example of a scene rendered using textures from varying mipmap levels to render a scene.

FIG. 3 is an example of a scene 300 rendered using textures from varying mipmap levels. For example, the regions of the 3D scene 300 that are closest to the user's point of view and/or that are the most likely to be interacted with, inspected, etc., by the user may benefit from being mapped with a higher level of detail texture from the corresponding texture mipmap, whereas the system may benefit from mapping regions of the 3D scene 300 that are more peripheral to or less prominent in the user's point of view with a lower level of detail.

Figure 4:
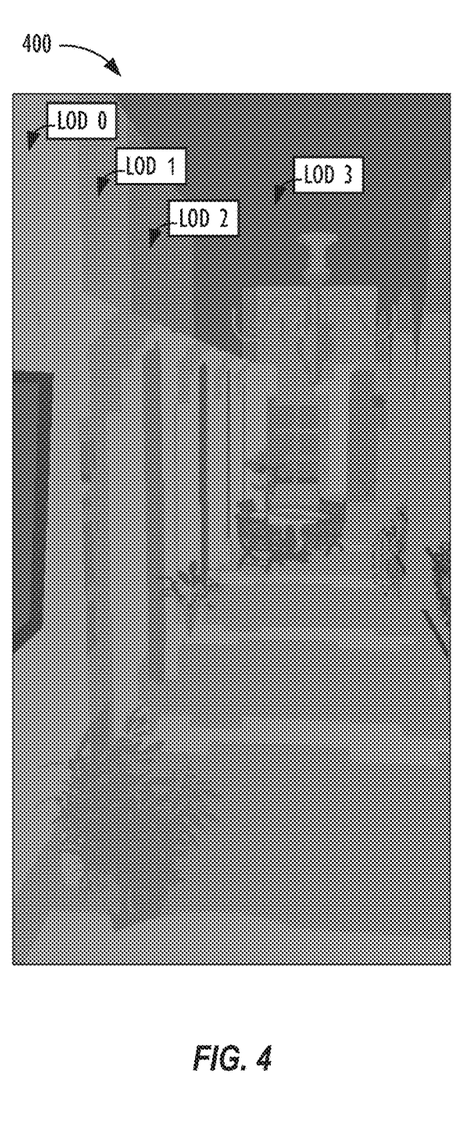
FIG. 4 is an example of a mipmap level usage map for the rendered scene of FIG. 3.

FIG. 4 is an example of a mipmap level usage map 400 for the rendered scene 300 of FIG. 3. As illustrated in FIG. 4, various LOD versions of the textures appearing in scene 300 may be loaded for different portions of the rendered scene. For example, the upper-leftmost region of mipmap level usage map 400 is shaded in the lightest tone of gray and labeled "LOD 0," indicating that the parts of scene 300 corresponding to the regions shaded in this tone of gray in mipmap level usage map 400 will utilize the highest quality level of texture available in the texture mipmaps. Moving just to the right of the region labeled "LOD 0" is a region shaded in a slightly darker tone of gray, labeled "LOD 1." LOD1 may reflect a LOD that is of a lower quality that LOD 0, e.g., LOD 1 may be half of the resolution of the region labeled "LOD 0" in FIG. 4.

Continuing to move across usage map 400, the next slightly darker shaded region is labeled "LOD 2," indicating an even lower level of quality than the "LOD 1" region (e.g., another decrease in resolution by a factor of two, as compared to LOD 1). Finally, regions in the darkest shade of gray, labeled "LOD 3" in FIG. 4, represent the regions using the lowest level of quality texture for the texture mapping (e.g., another decrease in resolution by a factor of two, as compared to LOD 2). According to some embodiments, and to achieve even greater increased efficiencies, only the necessary portions (e.g., tiles that have been accessed the most recently and/or the most frequently) of only the necessary LOD mipmaps may be backed in memory at any given moment in time, thus providing a programmer with more fine-grained control over what portions of the various textures in the scene are either loaded or not loaded into memory.

Figure 5:
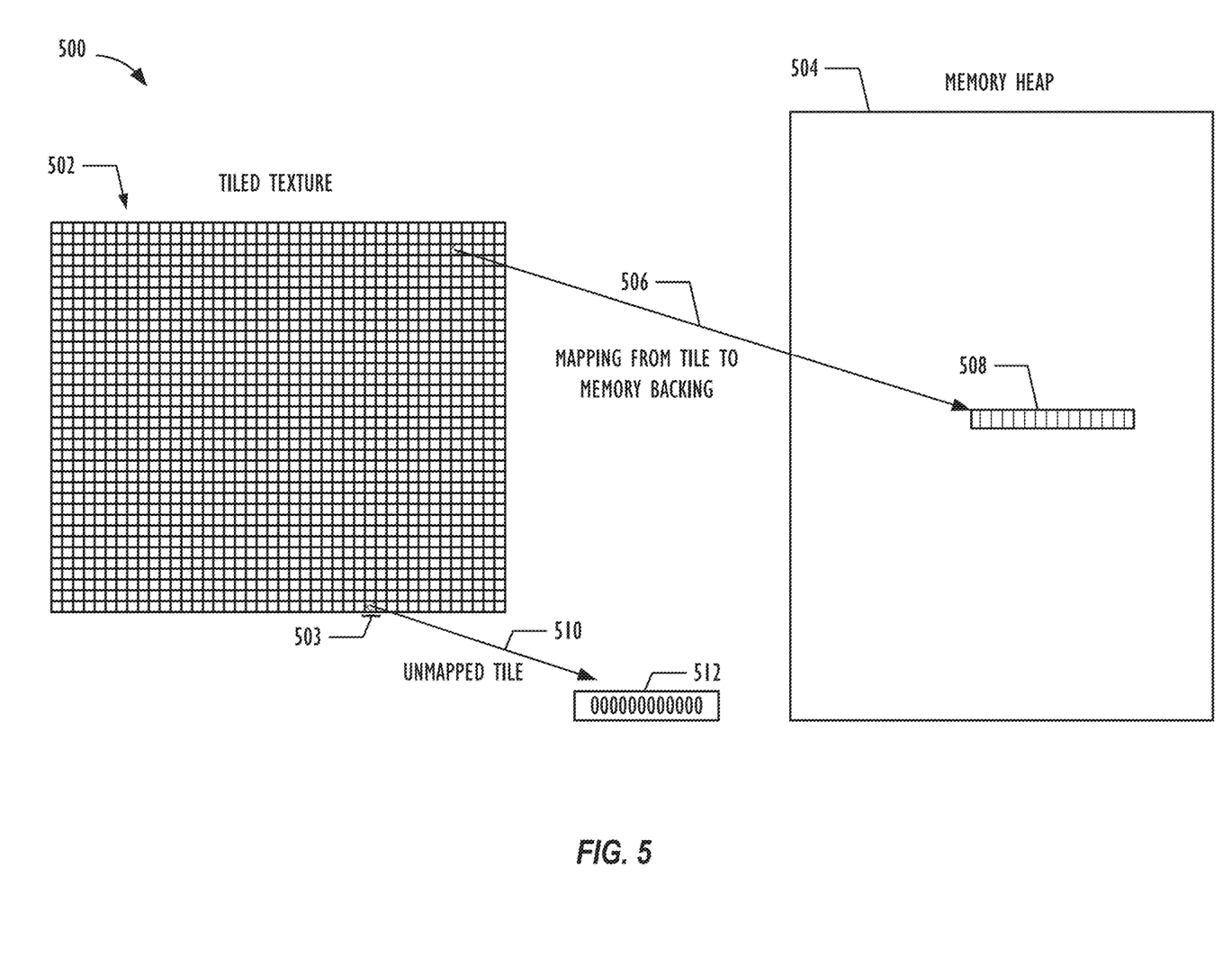
FIG. 5 is a block diagram illustrating the relationship between the tiles of an exemplary tiled texture and their respective memory backings.

FIG. 5 is a block diagram 500 illustrating the relationship between the tiles 503 of an exemplary tiled texture 502 and their respective memory backings 508 in a memory heap 504. As described above, according to some embodiments, statistical information, e.g., as obtained from hardware counters, may be used to help prioritize the mapping and unmapping of textures—even on a per-tile basis for a given texture(s). For a given tile that is mapped 506 to memory, the memory backing in a given pool of allocated memory (e.g., memory heap 504) may comprise a corresponding memory page 508 where the relevant portion of the relevant texture is written.

According to some embodiments, all tiles may be unmapped by default. According to such embodiments, a read from an unmapped region 510 may result in all zero values 512 being returned. An attempted write to an unmapped region may simply be discarded. In instances where one or more textures are blended with each other, the return of all zero values for an unmapped region in one of the textures may not present any undesired visual artifacts and may, instead, simply result in a less intense value or version of the mapped value in the blending operation. In some embodiments, the graphics processor management system may also provide an affirmative ACK/NACK, i.e., acknowledgement, indicator as to the mapped status of a given region, such that a developer would know if the sample is coming from an unmapped region in memory or a mapped region in memory that simply happens to have all zero values.

In embodiments, a developer may manually map tiles into physical memory, e.g., via the use of an API. However, in embodiments where mapping and unmapping take place on the graphics processor's timeline, the developer may also be responsible for unmapping a texture before it is released from memory. If a developer fails to unmap a given texture before it is released, the mapped tiles will stay occupied on the memory heap until the heap itself is released (which may or may not be desired by the developer).

According to certain embodiments, the size and location of each mapping region may be aligned to a tile or texture's boundaries. If that requirement is not met, the region may be extended outwards to the nearest tile boundary. If a region is mapped with more tiles than are available on the heap, the tiles may be mapped on a first-come, first-served basis, e.g., following row-major order.

For each texture, mipmaps (starting from some level) can be placed in a single structure, referred to herein as a "tail," to save additional memory. From the developer's perspective, the tail may be interacted with as a single page in memory, and thus, the developer only has to explicitly map memory for the first mip level in the tail structure. This mapping ensures that all lower mip levels are mapped.

Figure 6:
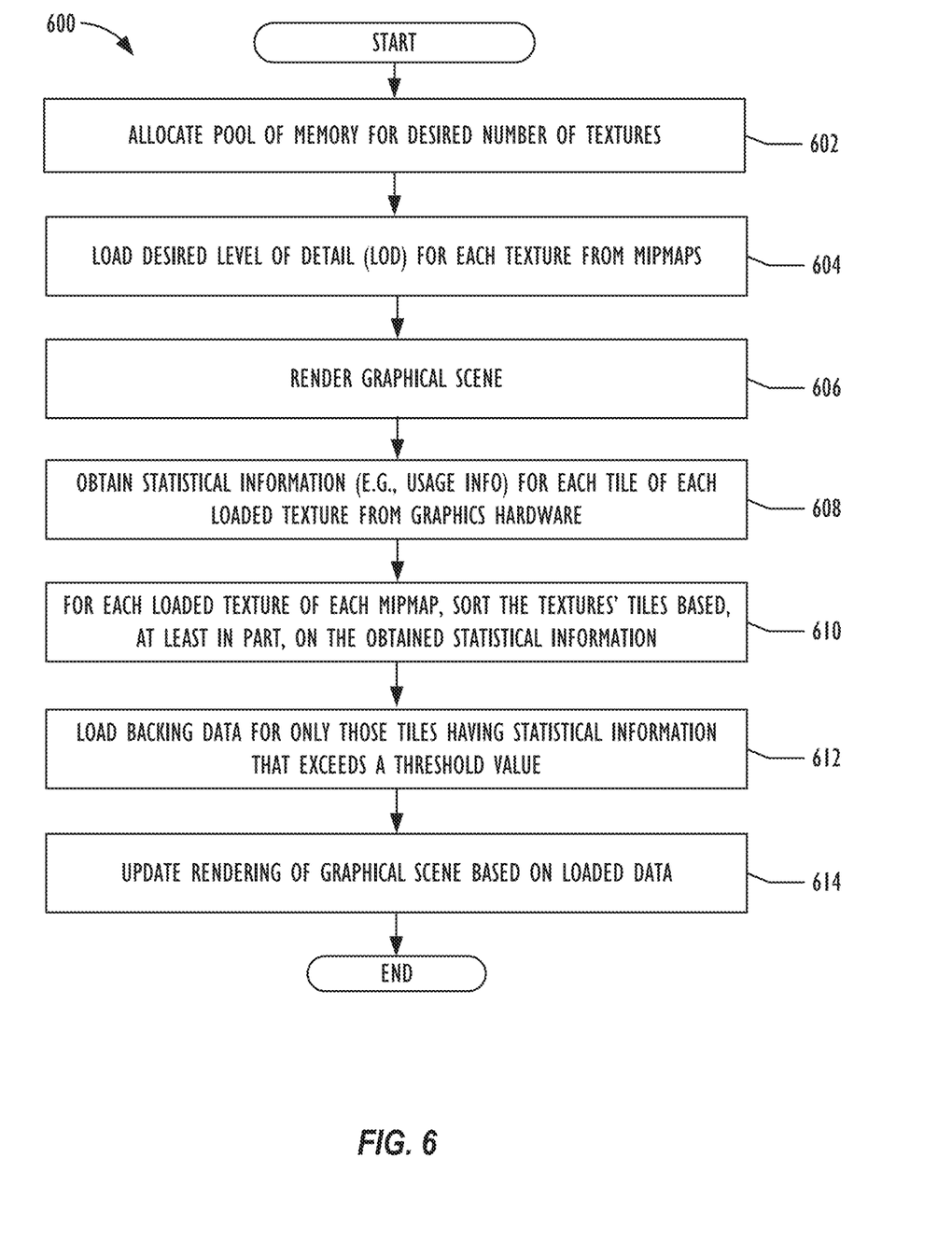
FIG. 6 is a flow diagram of operation for managing graphics hardware resources using sparsely-backed texture resources.

FIG. 6 is a flow diagram of operation 600 for managing graphics hardware resources using sparsely-backed texture resources. In some embodiments, operation 600 may be initiated or performed by one or more processors in response to one or more instructions stored in a computer-readable storage medium. For example, operation 600 may be performed, at least in part, by the graphics hardware resource allocation system 108 shown in FIG. 1. The use and discussion of FIG. 6 is only an example to facilitate explanation and is not intended to limit the disclosure to this specific example. For example, although FIG. 6 illustrates that the blocks within operation 600 are implemented in a sequential order, operation 600 is not limited to this sequential order.

At block 602, operation 600 may initially allocate a pool of memory for a desired number of textures, e.g., all or a subset of the textures needed for the rendering of the current graphical scene. Next, at block 604 the operation may load a desired LOD version for each desired texture for which memory has been allocated at block 602. As described above, the various LOD versions for a given texture may be stored in the form of a mipmap. Next, at block 606, the graphical scene may be rendered using the loaded textures.

At block 608, the operation 600 may begin to obtain and/or accumulate statistical information over time for each texture (or portion of texture) that has been loaded. As detailed above, according to some embodiments, the statistical information may comprise usage information, e.g., a counter value reflecting the number of times a certain texture (or portion of a texture, such as a "tile" region within the texture) has been accessed.

Next, at block 610, for each loaded texture, the textures (or portions of textures, depending on the level of the granularity of the reported statistical information) may be sorted based, at least in part, on the obtained statistical information. For example, the textures or portions of a given texture that have been accessed and loaded from memory the most number of times may be sorted to a top of a sorting order, and the textures or portions of a given texture that have been accessed and loaded from memory the fewest number of times may be sorted to a bottom of the sorting order.

Next, at block 612, the operation 600 may determine to load backing data (i.e., "map" to locations in memory) for only those textures or portions of textures having statistical information that exceeds a threshold value, e.g., a threshold minimum number of loads from memory over a given time interval. The textures or portions of textures that do not exceed the threshold value may be left unbacked or "unmapped" in physical memory, at least until the statistical information for such textures or portions of textures again exceed the threshold value, at which point they may again be mapped and backed by locations in physical memory. As described above, according to some embodiments, one or more ordering rules may be applied to determine which textures (or portions of textures) are actually mapped in memory, e.g., in situations where there is not enough physical memory available to back all the desired textures or portions of textures at a given moment in time. Finally, at block 614, the graphical rendering of the scene may be updated based on the newly-mapped (or unmapped) textures in physical memory. Where there are not further frames to render graphical information for, the operation 600 may end.

Other Illustrative Systems

Figure 7:
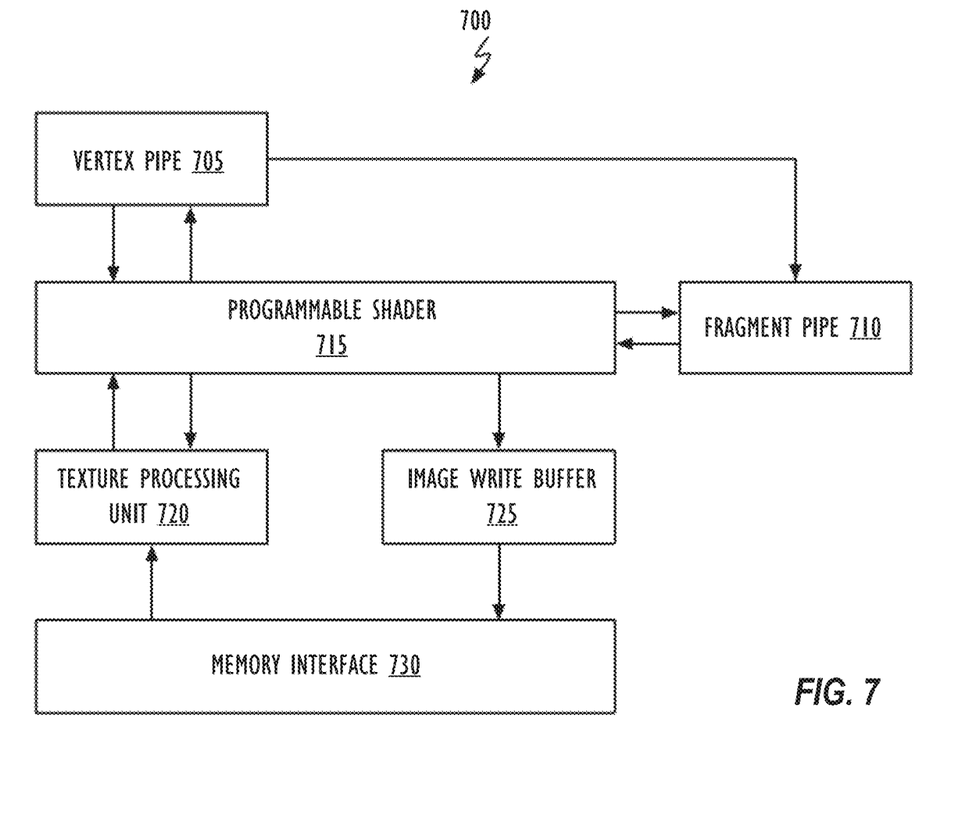
FIG. 7 is a simplified block diagram illustrating one embodiment of a graphics processor.

FIG. 7 is a simplified block diagram 700 illustrating one embodiment of a graphics processor. In the illustrated embodiment, graphics processor 700 includes vertex pipe 705, fragment pipe 710, programmable shader 715, texture processing unit (TPU) 720, image write buffer 725, and memory interface 730. In some embodiments, graphics unit 700 may be configured to process both vertex and fragment data using programmable shader 715, which may be configured to process data (e.g., graphics data) in parallel using multiple execution pipelines or instances. In other embodiments, the multiple execution pipelines correspond to a plurality of execution units of a processing circuit hardware resource allocation system.

Vertex pipe 705 may include various fixed-function hardware configured to process vertex data. Vertex pipe 705 may be configured to communicate with programmable shader 715 to coordinate vertex processing, and to send processed data to fragment pipe 710 and/or programmable shader 715 for further processing. Fragment pipe 710 may include various fixed-function hardware configured to process pixel data. Fragment pipe 710 may be configured to communicate with programmable shader 715 in order to coordinate fragment processing. Fragment pipe 710 may also be configured to perform rasterization on polygons received from vertex pipe 705 and/or programmable shader 715 so as to generate fragment data. Vertex pipe 705 and/or fragment pipe 710 may be coupled to memory interface 730 (coupling not shown) in order to access graphics data.

Programmable shader 715 may be configured to receive vertex data from vertex pipe 705 and fragment data from fragment pipe 710 and/or TPU 720. Programmable shader 715 may be further configured to perform vertex processing tasks on vertex data, including various transformations and/or adjustments of vertex data. By way of example, programmable shader 715 may also be configured to perform fragment processing tasks on pixel data such as texturing and shading. Programmable shader 715 may include multiple execution instances for processing data in parallel. In various embodiments, portions (e.g., execution units, registers, arithmetic logic units, memory locations, etc.) of programmable shader 715 may be usable by multiple processes (e.g., vertex processing tasks, compute processing tasks and fragment processing tasks). In practice, different portions of programmable shader 715 may be allocated to different processes during execution of those processes. Programmable shader 715 in one or more embodiments may be coupled in any of various appropriate configurations to other programmable and/or fixed-function elements in a graphics unit. The configuration shown in FIG. 7 is illustrative only.

TPU 720 may be configured to schedule fragment processing tasks from programmable shader 715. In some embodiments, TPU 720 may be configured to pre-fetch texture data and assign initial colors to fragments for further processing by programmable shader 715 (e.g., via memory interface 730). In other embodiments, TPU 720 may be configured to provide fragment components in one or more normalized integer formats or one or more floating-point formats. In still other embodiments, TPU 720 may be configured to provide fragments in groups of four (a "fragment quad") in a 2×2 format to be processed by a group of four execution pipelines in programmable shader 715. Image write buffer 725 may be configured to store processed tiles of an image and may further perform final operations to a rendered image before it is transferred to a frame buffer (e.g., in a system memory via memory interface 730). Memory interface 730 may facilitate communication between graphics unit 700 and one or more of various memory hierarchies in various embodiments.

Figure 8:
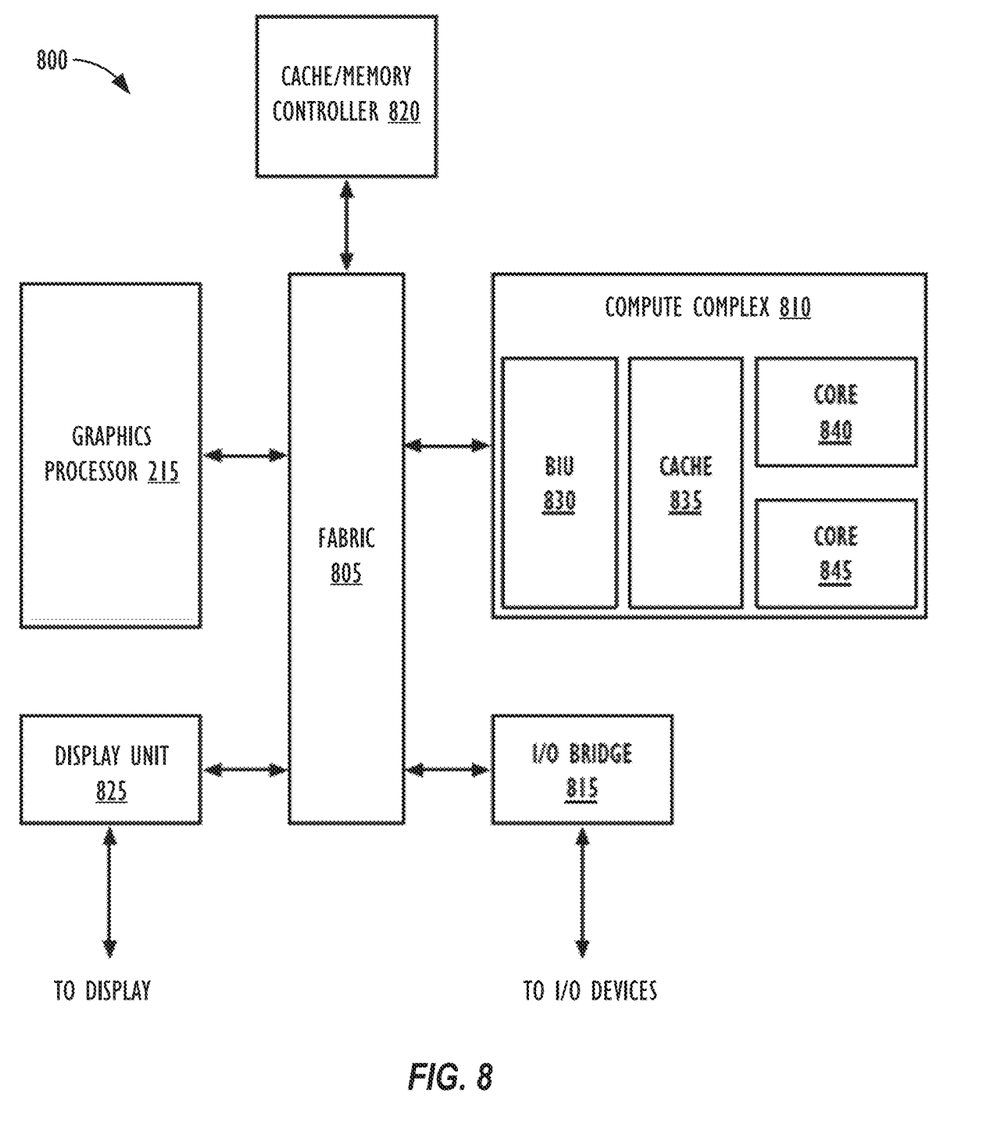
FIG. 8 is block diagram illustrating an embodiment of a computing system that includes at least a portion of a graphics hardware resource allocation system.

Turning next to FIG. 8, a block diagram illustrating an exemplary embodiment of a computing system 800 that includes at least a portion of a graphics hardware resource allocation system. The computing system 800 includes a graphics processor 215.

In some embodiments, some or all elements of the computing system 800 may be included within a system on a chip (SoC). In other embodiments, computing system 800 may be included in a mobile device. Accordingly, in at least some embodiments, area and power consumption of the computing system 800 may be important design considerations. In the illustrated embodiment, the computing system 800 includes communication's fabric 805, graphics processor 215, compute complex 810, input/output (I/O) bridge 815, cache/memory controller 820, and display unit 825. Although the computing system 800 illustrates graphics processor 215 as being connected to fabric 805 as a separate device of computing system 800, in other embodiments, graphics processor 215 may be connected to or included in other components of the computing system 800.

Additionally, the computing system 800 may include multiple graphics processors 215. The multiple graphics processors 215 may correspond to different embodiments or to the same embodiment. Fabric 805 may include various interconnects, buses, MUXes, controllers, etc., and may be configured to facilitate communication between various elements of computing system 800. In some embodiments, portions of fabric 805 are configured to implement various different communication protocols. In other embodiments, fabric 805 implements a single communication protocol and elements coupled to fabric 805 may convert from the single communication protocol to other communication protocols internally.

In the illustrated embodiment, compute complex 810 includes bus interface unit (BIU) 830, cache 835, and cores 840 and 845. In some embodiments, cores 840 and 845 may correspond to execution cores. In various embodiments, compute complex 810 includes various numbers of cores and/or caches. For example, compute complex 810 may include 1, 2, or 4 processor cores, or any other suitable number. In some embodiments, cores 840 and/or 845 include internal instruction and/or data caches. In some embodiments, a coherency unit (not shown) in fabric 805, cache 835, or elsewhere in computing system 800 is configured to maintain coherency between various caches of computing system 800. BIU 830 may be configured to manage communication between compute complex 810 and other elements of computing system 800. Processor cores such as cores 840 and 845 may be configured to execute instructions of a particular instruction set architecture (ISA), which may include operating system instructions and user application instructions. I/O bridge 815 may include various elements configured to implement: universal serial bus (USB) communications, security, audio, and/or low-power always-on functionality, for example. I/O bridge 815 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 800 via I/O bridge 815.

In some embodiments, graphics processor 215 may be coupled to computing system 800 via I/O bridge 815. Cache/memory controller 820 may be configured to manage the transfer of data between fabric 805 and one or more caches and/or memories (e.g., non-transitory computer readable mediums). For example, cache/memory controller 820 may be coupled to an L3 cache, which may, in turn, be coupled to a system memory. In other embodiments, cache/memory controller 820 is directly coupled to a memory. In some embodiments, the cache/memory controller 820 includes one or more internal caches. In some embodiments, the cache/memory controller 820 may include or be coupled to one or more caches and/or memories that include instructions that, when executed by one or more processors (e.g., compute complex 810 and/or graphics processor 215), cause the processor, processors, or cores to initiate or perform some or all of the operations described above with reference to FIGS. 1-7. Display unit 825 may be configured to read data from a frame buffer and provide a stream of pixel values for display. Display unit 825 may be configured as a display pipeline in some embodiments. Additionally, display unit 825 may be configured to blend multiple frames to produce an output frame. Further, display unit 825 may include one or more interfaces (e.g., MIPI or embedded display port, eDP) for coupling to a user display (e.g., a touchscreen or an external display).

As used herein, the term "coupled to" may indicate one or more connections between elements, and a coupling may include intervening elements. For example, in FIG. 8, display unit 825 may be described as "coupled to" compute complex 810 through fabric 805. In contrast, in the illustrated embodiment of FIG. 8, display unit 825 is "directly coupled" to fabric 805 because there are no intervening elements.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An un-programmed field-programmable gate array (FPGA), for example, would not be considered to be "configured to" perform some specific function, although it may be "configurable to" perform that function after programming.

As used herein, the term "based on" is used to describe one or more factors that affect a determination. This term does not foreclose the possibility that additional factors may also affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose the situation in which the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose the situation in which the performance of A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a processing circuit that includes six clusters, the terms "first cluster" and "second cluster" can be used to refer to any two of the six clusters, and not, for example, to two specific clusters (e.g., logical clusters 0 and 1).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system—and business-related constraints), and that these goals may vary from one implementation to another. It will also be appreciated that such development efforts might be complex and time-consuming, but would nevertheless be a routine undertaking for those of ordinary skill in the design and implementation of graphics processing systems having the benefit of this disclosure.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other. The scope of the invention therefore should be determined with reference to the appended claims, along with the full scope of equivalents to which such claims are entitled.

The invention claimed is:

1. A non-transitory program storage device, readable by one or more processors and comprising instructions stored thereon to cause the one or more processors to:
    allocate a first region in a first physical memory for a first one or more graphical textures;
    load a desired level of detail (LOD) version for each of the first one or more graphical textures;
    render a first graphical scene using the loaded versions of the first one or more graphical textures;
    obtain statistical information related to at least a portion of at least one of the first one or more graphical textures, wherein the statistical information for each respective at least a portion of each of the first one or more graphical textures comprises a number of memory accesses;
    sort each portion of each of the first one or more graphical textures in descending order, based, at least in part, on the obtained statistical information;
    attempt to load only those portions having statistical information that exceeds a threshold value into the first physical memory; and
    update the rendering of the first graphical scene based, at least in part, on the loaded portions.

2. The non-transitory program storage device of claim 1, wherein the one or more processors are on a graphics processing unit (GPU).

3. The non-transitory program storage device of claim 2, wherein the instructions to load only those sorted portions having statistical information that exceeds a threshold value are executed by a compute channel of the GPU.

4. The non-transitory program storage device of claim 1, wherein the instructions to load only those sorted portions having statistical information that exceeds a threshold value are executed in a single thread group.

5. The non-transitory program storage device of claim 1, wherein the portions of each of the first one or more graphical textures comprise tiles.

6. The non-transitory program storage device of claim 1, wherein the instructions to load only those sorted portions having statistical information that exceeds a threshold value further comprise instructions to load the sorted portions according to a row-major order.

7. The non-transitory program storage device of claim 1, wherein the obtained statistical information comprises counter values obtained from a GPU.

8. The non-transitory program storage device of claim 7, wherein each counter value corresponds to a tile from one of the first one or more graphical textures.

9. A system comprising:
a first physical memory; and
a processor that interacts with the first physical memory, wherein the processor is configured to execute instructions to:
allocate a first region in the first physical memory for a first one or more graphical textures;
load a desired LOD version for each of the first one or more graphical textures;
render a first graphical scene using the loaded versions of the first one or more graphical textures;
obtain statistical information related to at least a portion of at least one of the first one or more graphical textures, wherein the statistical information for each respective at least a portion of each of the first one or more graphical textures comprises a number of memory accesses;
sort each portion of each of the first one or more graphical textures in descending order, based, at least in part, on the obtained statistical information;
attempt to load only those sorted portions having statistical information that exceeds a threshold value into the first physical memory; and
update the rendering of the first graphical scene based, at least in part, on the loaded portions.

10. The system of claim 9, wherein the processor is part of a GPU.

11. The system of claim 10, wherein the instructions to load only those sorted portions having statistical information that exceeds a threshold value are executed by a compute channel of the GPU.

12. The system of claim 9, wherein the instructions to load only those sorted portions having statistical information that exceeds a threshold value are executed in a single thread group.

13. The system of claim 9, wherein the portions of each of the first one or more graphical textures comprise tiles.

14. The system of claim 9, wherein the instructions to load only those sorted portions having statistical information that exceeds a threshold value further comprise instructions to load the sorted portions according to a row-major order.

15. The system of claim 9, wherein the obtained statistical information comprises counter values obtained from a GPU.

16. The system of claim 15, wherein each counter value corresponds to a tile from one of the first one or more graphical textures.

17. A computer-implemented method comprising:
allocating a first region in a first physical memory for a first one or more graphical textures;
loading a desired LOD version for each of the first one or more graphical textures;
rendering a first graphical scene using the loaded versions of the first one or more graphical textures;
obtaining statistical information related to at least a portion of at least one of the first one or more graphical textures, wherein the statistical information for each respective at least a portion of each of the first one or more graphical textures comprises a number of memory accesses;
sorting each portion of each of the first one or more graphical textures in descending order, based, at least in part, on the obtained statistical information;
attempting to load only those sorted portions having statistical information that exceeds a threshold value into the first physical memory; and
updating the rendering of the first graphical scene based, at least in part, on the loaded portions.

18. The computer-implemented method of claim 17, wherein the method is performed on a GPU.

19. The computer-implemented method of claim 18, wherein the obtained statistical information comprises counter values obtained from the GPU.

20. The computer-implemented method of claim 17, wherein loading only those sorted portions having statistical information that exceeds a threshold value further comprises loading the sorted portions according to a row-major order.

* * * * *